J. A. MARTINKO.
TROLLEY HARP.
APPLICATION FILED MAY 17, 1919.
1,326,762.
Patented Dec. 30, 1919.
2 SHEETS—SHEET 1.
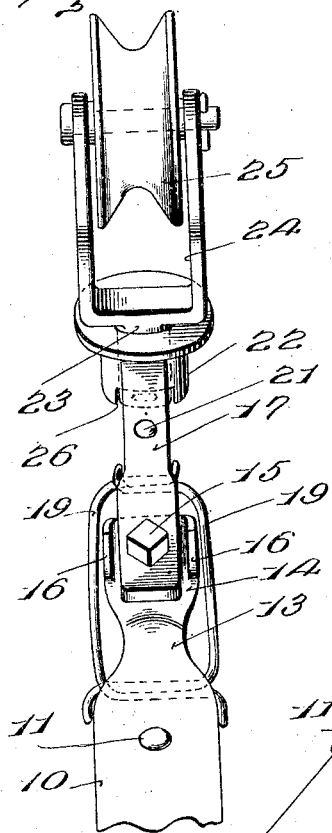
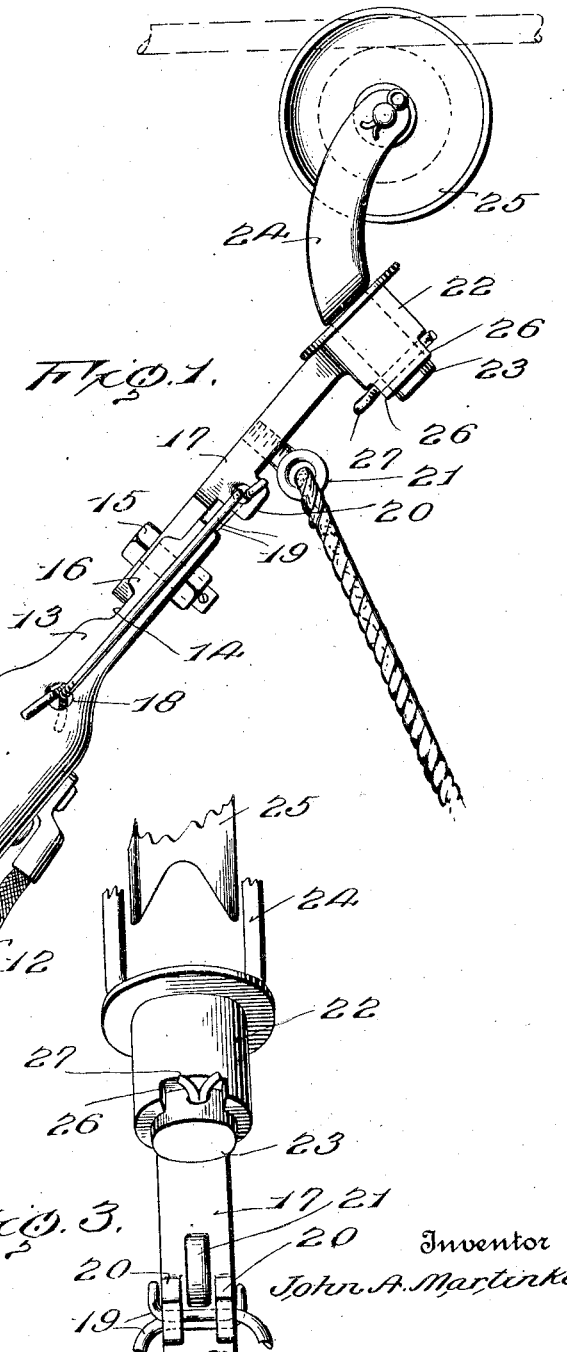
Inventor
John A. Martinko

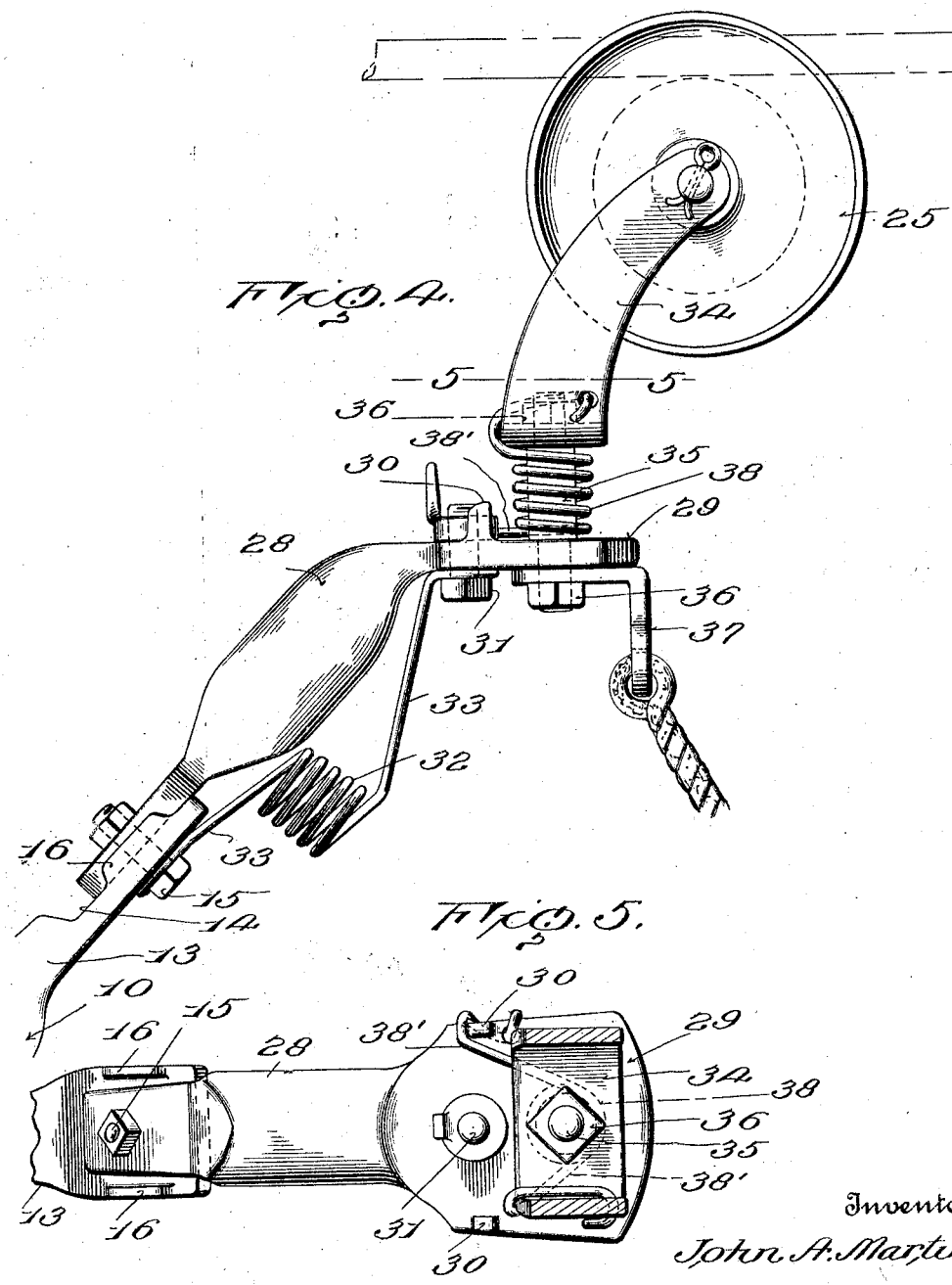

UNITED STATES PATENT OFFICE.

JOHN ANDY MARTINKO, OF BEAVERDALE, PENNSYLVANIA.

TROLLEY-HARP.

1,326,762.

Specification of Letters Patent.

Patented Dec. 30, 1919.

Application filed May 17, 1919. Serial No. 297,790.

*To all whom it may concern:*

Be it known that I, JOHN A. MARTINKO, a citizen of the United States, residing at Beaverdale, in the county of Cambria, State of Pennsylvania, have invented certain new and useful Improvements in Trolley-Harps; and I do hereby declare the following to be a full, clear, and exact description of the invention, such as will enable others skilled in the art to which it appertains to make and use the same.

This invention relates to new and useful improvements in trolley harps, the object thereof being to provide a novel and improved mounting for the harp or fork of a trolley pole upon its supporting socket and shank so that the trolley wheel may swing laterally to properly follow the trolley wire, especially when taking switches or insulating supporters, thus preventing the trolley wheel from jumping the wire.

A further object of the invention is to provide a novel connection between the shank portion and the socket so as to compensate for side sway of the car on the tracks, with respect to the trolley wire supported for engagement by the trolley wheel in the usual manner, thus further obviating the displacement of the trolley wheel.

With the above objects and others in view as will appear as the specification proceeds, the invention comprises certain novel combinations and arrangements of parts as will be hereinafter more particularly pointed out and claimed.

Reference is had to the accompanying drawings forming a part of this application, wherein like characters designate corresponding parts throughout the several views, in which—

Figure 1 is a side elevation of a trolley harp constructed in accordance with the invention, Fig. 2 is a front elevation, Fig. 3 is a rear elevation, Fig. 4 is a side elevation of a modified construction, and Fig. 5 is a sectional view taken on the line 5—5 of Fig. 4.

Referring to the drawings in detail, the numeral 10, designates a socket designed to be attached to a trolley pole in the usual manner, said socket being mounted on the upper end of the pole and anchored by suitable cross bolts 11. This socket has connected thereto the usual conductor wire 12.

The socket is reduced at 13 and flattened at 14 at its upper end and also formed at the sides thereof with flanges 16 defining an intermediate recess.

The recess is designed to receive the lower extremity of a shank 17, which is flattened and broadened to fit said recess for slight lateral movement limited by the flanges 16, on the pivot bolt 15. The socket besides being transversely apertured to receive the bolts for securing the device to a trolley pole, is apertured at right angles thereto as shown at 18 so as to receive oppositely disposed bowed springs and bonds 19. These are of electrical conducting material such as copper wire and have their upper ends bent through spaced rearwardly projecting apertured lugs 20 carried by the shank portion 17 and above which is disposed an eye bolt 21 for connection of the trolley cord or rope at the rear.

The shank 17 is formed at its upper end with an inclined bearing sleeve 22 adapted to receive the stem 23 of the fork or harp proper 24 in which the trolley wheel 25 is journaled. This sleeve has its rear end provided with upper and lower alined notches 26 designed to accommodate a cotter pin or other locking key 27 diametrically engaged through the stem of the fork so as to permit but yet limit lateral turning of the fork in said sleeve.

In the modification shown in Figs. 4 and 5 of the drawings, there is provided instead of the shank 17, an enlargement 28 terminating in a relatively flat horizontal portion 29 produced with side lugs 30 forming flanges. A bolt 31 is passed vertically through said flattened portion and between said bolt and the pivot bolt 15, there is provided a coil spring 32 having oppositely extending arms 33 formed with terminal eyes for engaging said bolts, thus serving as a bond and centralizing means permitting lateral play of the harp but normally holding the same in a central position. The fork 34 has its stem 35 engaged through a bearing in the flattened portion and retained in position by a nut 36, the latter also holding an angular bracket 37 apertured to receive the trolley cord. A spring 38 is coiled on the stem and has its opposite ends anchored to the flattened portion of the shank 28 and to one arm of the fork at opposite sides through the medium of extensions 38′ of said spring engaging respective apertures in said flattened portion and arm. This spring serves to hold the fork in alinement with the wire but permits limited lateral turning of the trolley wheel to insure its retention on the wire.

Thus, it will be seen that I have provided a very efficient construction designed to overcome the usual difficulties in connection with the trolley car systems which by reason of the trolley being retained in proper engagement with the wire beneath it, will considerably reduce the cost of maintenance of a trolley system.

The flat horizontal portion forms a bearing sleeve corresponding to the inclined bearing sleeve 22 which receives the shank 23 of the fork or harp proper 24, so as to permit lateral turning or oscillation of the wheel.

What is claimed is:—

1. A trolley harp comprising a pole member having at its upper end a flattened portion, a second member having a shank pivoted to said flattened portion for lateral swinging movement, a spring bond between the members to normally hold them in alinement, a trolley wheel, a support therefor having a stem rotatably mounted in said second member, and means to hold said support with its wheel in alinement with the wire.

2. A trolley harp comprising a pole engaging socket, a fork for a trolley wheel having a stem, a shank pivoted to said socket for lateral swinging movement, said stem being pivoted to the shank, a spring bond between the shank and socket permitting limited lateral swing of the shank, rope attaching means carried by the shank, said shank having a bearing receiving the stem for lateral turning movement, and means to limit said movement.

3. A trolley harp comprising a pole engaging socket, means to connect said socket to the pole, said socket having a reduced flattened portion having side flanges, a sleeve, a shank thereon pivoted to said flattened portion for lateral swinging movement between its flanges, a spring bond between said shank and the socket to normally hold said shank in alinement with the socket but to permit limited lateral movement thereof, a fork, a trolley wheel journaled therein, a stem on the fork rotatably engaging the sleeve, means to anchor the fork in position against displacement, and means to hold said fork in alinement with the wire and limit the lateral turning thereof.

4. A trolley harp comprising a pole member having at its upper end a flattened portion with upright side flanges, a second member having a shank pivoted to said flattened portion between its flanges for lateral swinging movement, a spring bond between the members to normally hold them in alinement, a fork, a trolley wheel journaled therein, a stem on the fork rotatably mounted in said second member, and means to hold said fork in alinement with the wire and limit the lateral turning thereof.

In testimony whereof, I affix my signature, in the presence of two witnesses.

JOHN ANDY MARTINKO.

Witnesses:
A. E. SHANNON,
JOSEPH ×(his mark) SMITH.